United States Patent
Graham-Cumming, Jr.

(10) Patent No.: US 6,182,146 B1
(45) Date of Patent: *Jan. 30, 2001

(54) AUTOMATIC IDENTIFICATION OF APPLICATION PROTOCOLS THROUGH DYNAMIC MAPPING OF APPLICATION-PORT ASSOCIATIONS

(75) Inventor: John Graham-Cumming, Jr., Menlo Park, CA (US)

(73) Assignee: Compuware Corporation, Farmington Hills, MI (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/884,396

(22) Filed: Jun. 27, 1997

(51) Int. Cl.$^7$ ............................ G06F 15/173; G06F 15/16
(52) U.S. Cl. ........................ 709/238; 709/224; 709/231; 709/235; 709/238; 709/239; 709/245; 709/246; 709/248; 709/250; 370/389; 370/392; 370/400; 370/401; 370/402; 370/469
(58) Field of Search ................ 395/200.68, 200.61, 395/200.78, 200.65; 370/401, 392, 402, 400, 389, 469; 709/238, 231, 248, 235, 250, 224, 226, 239, 245, 246

(56) References Cited

U.S. PATENT DOCUMENTS

| | | | |
|---|---|---|---|
| 5,519,867 | * | 5/1996 | Moeller et al. ...................... 709/107 |
| 5,537,417 | * | 7/1996 | Sharma et al. ...................... 709/228 |
| 5,566,336 | * | 10/1996 | Futatsugi et al. .................... 395/701 |
| 5,636,371 | * | 6/1997 | Yu ........................................ 709/250 |
| 5,640,394 | * | 6/1997 | Schrier et al. ....................... 370/389 |
| 5,640,399 | * | 6/1997 | Rostoker et al. .................... 370/392 |
| 5,649,105 | * | 7/1997 | Aldred et al. ....................... 709/220 |
| 5,684,800 | * | 11/1997 | Dobbins et al. ..................... 370/401 |
| 5,708,659 | * | 1/1998 | Rostoker et al. .................... 370/392 |
| 5,719,942 | * | 2/1998 | Aldred et al. ....................... 709/228 |
| 5,734,865 | * | 3/1998 | Yu ........................................ 709/250 |
| 5,734,887 | * | 3/1998 | Kingberg et al. .................... 707/4 |
| 5,787,253 | * | 7/1998 | McCreery et al. ................ 395/200.61 |

(List continued on next page.)

Primary Examiner—Mehmet B. Geckil
Assistant Examiner—William C. Vaughn, Jr.
(74) Attorney, Agent, or Firm—Blakely, Sokoloff, Taylor & Zafman

(57) ABSTRACT

A system, method, and software product dynamically determine network applications associated with any ports being used by packets on a network, allowing the packets to be properly routed, counted, and reported according to their applications. In one embodiment, an application-port mapping table stores static associations or mappings between applications and ports, as defined by a standards body or other source. The application-port mapping table is dynamically updated during runtime to reflect dynamic associations between applications and ports as extracted from packet data. The associations are identified by a packet analysis module which performs a two step verification of an application for a packet. In a first step, the packet analysis module applies the ports from a packet to the application-port mapping table to obtain a first application identifier. In a second, separate step, the packet analysis module applies identification logic to the packet to identify an application based on packet data. The second step may be used for each packet or only where the packet is not identified by the application-port mapping table. If a second application is successfully identified, the packet analysis module updates the application-port mapping table by adding a new association between the second identified application, and a port of the packet. To keep the application-port mapping table current, the table is periodically scanned to remove associations which have expired; alternatively, an association is removed when an end of sequence packet for its application is detected.

11 Claims, 6 Drawing Sheets

U.S. PATENT DOCUMENTS 5,797,041 * 8/1998 Yasue et al. ............................. 710/52
5,835,710 * 11/1998 Nagami et al. .................... 395/200.8
5,838,920 * 11/1998 Rosborough ......................... 709/224
5,883,945 * 3/1999 Richardson, Jr. et al. .......... 379/189
5,995,608 * 11/1999 Detampel, Jr. et al. ............. 379/205
6,061,349 * 5/2000 Coile et al. .......................... 370/389

* cited by examiner

TCP Header for HTTP Protocol

| Source Port = 80 | Destination Port |
|---|---|
| 32 bit Sequence Number ||
| 32 bit Acknowledgment Number ||
| Flags | Window |
| Checksum | Urgent Pointer |

*FIG. 1*

TCP Header for HTTP Protocol for Port 8080

| Source Port = 8080 | Destination Port |
|---|---|
| 32 bit Sequence Number ||
| 32 bit Acknowledgment Number ||
| Flags | Window |
| Checksum | Urgent Pointer |

*FIG. 2*

AUTOMATIC IDENTIFICATION OF APPLICATION PROTOCOLS THROUGH DYNAMIC MAPPING OF APPLICATION-PORT ASSOCIATIONS

BACKGROUND

1. Field of Invention

The present invention relates generally to the field of computer network management, and more particularly, to systems, methods, and software ax products for identifying network applications for processing packet data.

2. Background of the Invention

Conventional network applications in computer networks running over common layer 3 (network layer) protocols use static port mappings. A port mapping defines the specific port or socket number that network traffic for a specific network application is routed to, or sent from. These port mappings are available from the Internet Assigned Numbers Authority (IANA) in order to differentiate between applications. These application-port mappings are published and are well defined, and typically used to deliver network traffic to the appropriate applications.

When ports are defined statically in relationship to applications, it is possible for a network monitor, or similar product, to reliably identify traffic by looking at a single packet and checking its port number against the IANA (or similar) list. These static mappings are thus relied upon by network management software products to determine the protocols and applications being used for network traffic, and therefore compile information about traffic patterns, demand, latency, and other performance characteristics.

However, a number of network protocols allow for the use of dynamic application-port mappings. These protocols allow a packet to be sent from or directed to any available port, not only the statically defined ports. As a result, reliance on the static application-port mappings cannot guarantee accurate decoding and use of packets, or accurate analysis of network traffic.

For example, FIG. 1 illustrates the TCP header for a packet carrying HTTP traffic. The HTTP protocol (defined in RFC 1945) generally uses the port 80 when running over TCP (defined in RFC 793). Traffic for the HTTP protocol is thus identified by examining the source or destination ports in the TCP header for the value "80". This value identifies the packet as being a TCP packet for the HTTP protocol.

However, the URL specification for HTTP (defined in RFC 1738) allows a dynamic port to be added to the end of a URL request. For example, a URL for HTTP may have the form "http://www.company.com:8080", where the value "8080" identifies the port number to be used. FIG. 2 illustrates the TCP header in this case. With a port of 8080 it is not possible using conventional network management tools to identify this as HTTP traffic, since the standard port is not being used.

This problem has existed at least since the introduction of the HTTP protocol in 1991. This problem also occurs with other protocols, such as FTP, and NNTP, and for any of the many IP protocols. Indeed, dynamic ports are frequently used, for example to provide for security or for improved resource sharing. Accordingly, there is a need to be able to handle dynamic mappings for network traffic.

Several approaches have been attempted to solve this problem. Some existing solutions require that network management software be manually configured to add the mapping of the new port (e.g. 8080 or whatever other port number is used) to the application protocol HTTP (or other protocol). This requires the user of network management software to know in advance the ports being used, in order to configure the mapping. This is not a satisfactory solution since it is generally not possible to know the mappings ahead of time. In addition, the mappings can change at any time. Thus, preconfiguring the network management software with a fixed set of mapping means that software does not have great flexibility to deal with new mappings. In addition, the software will not be able to identify many packets which do not comply with its preconfigured mappings.

Other schemes require instrumentation of the application using the protocol to determine the port mappings it is using, or the interception of common protocol interfaces, such as in Microsoft Corp.'s WinSock, to attempt to determine the mapping required. Neither of these methods provide a non-intrusive or configuration-free method of identifying application traffic from a raw stream of data on a computer network.

Accordingly, it is desirable to provide a system, method and software product that can dynamically map application and port relationships and thereby correctly identify applications, protocols and other network data from packet data.

SUMMARY OF THE INVENTION

The present invention overcomes the limitations of conventional systems and methods by dynamically identifying the relationships between applications and ports in received packet data, and by storing and updating these relationships. In this manner, the present invention is able to identify the correct applications for packets that use either standard, default port numbers, or non-standard, dynamically defined port numbers.

In one embodiment, the present invention provides a computer-implemented method for dynamically determining a network application for a stream of network packets. A plurality of associations between network applications and ports are stored, for example, in a high speed cache. A packet is received from a network packet source. If there is a stored association between a network application and a port of the packet (as contained in the packet header), then the packet is provided to the network application so identified.

If there is no stored association between a network application and a port of the packet, the packet data, for example the payload and/or header, is analyzed to identify a network application for handling the packet, and a new association is stored between this identified network application and a port of the packet. This analysis may be made even if there was a previously stored association between a port of the packet and a network application.

Additionally, stored associations may have expiration times, based on a timestamp of the last packet that matched the port in a stored association, and a timeout value. Periodically, the stored associations are processed to remove associations that have expired, according their expiration times.

In one embodiment, the present invention operates in software products such as network monitors or protocol decoders. Such products are configured as follows. An application-port mapping table is used to store the associations between network applications and ports. Each network application is uniquely associated with, and identified by, one application identifier. A special identifier is used to represent an "unknown" application. The application-port mapping table is initialized with a set of static application-port mappings, such as defined by a standards authority. The application-port mapping table will be subsequently updated with new application-port associations as these are extracted from actual packet data that is received and processed. The application-port mapping table is preferably stored in high speed memory during runtime.

During runtime, packet data is received by a packet analysis module. The packet analysis module extracts from the packet its destination port and source port values. The packet analysis module applies these port values to the application-port mapping table. If the application-port mapping table contains an association with a port matching one of the ports for the packet, then the packet is positively identified, and the application-port mapping table returns the application identifier associated with the matching port. This first application identifier initially identifies the application for handling the packet.

In a conventional system, as explained above, if a packet includes a port value which that is not static value for the appropriate application, i.e. a dynamic port, the packet will not be properly identified as being appropriate for the application (the packet may still be received by the application since other mechanisms may be preserving this state information).

In the present invention, the application-port mapping table will initially not contain an association between the dynamic port and an application identifier, and thus the application for the packet will be unknown. However, unlike conventional approaches, the packet analysis module then analyzes the packet to determine the appropriate application for handling the packet. The analysis is preferably of the payload, but may also include the packet header. The analysis is generally based on predefined data patterns that are uniquely associated with each application. This analysis may include, for example, determining whether the payload includes a valid URL to an HTTP address, thereby indicating an HTIP application. Other payload specific data or patterns may also be recognized.

Once the packet analysis module successfully identifies the packet as belonging to a specific application, it creates a new entry in the application-port mapping table, associating a port number from the packet with the application identifier appropriate to the identified application. The packet analysis module also checks to make sure that no duplicate mappings for the port exist in the application-port mapping table. The next time a packet is received with the newly mapped port number, the application-port mapping table will correctly identify it. In this manner, the packet analysis module dynamically updates the application-port mapping table to include associations between application identifiers and ports extracted from packet data.

In some instances, even if the application-port mapping table does contain an association between an application identifier and a port, this association may no longer be valid. This is particularly true for associations that were dynamically created, as described above, since these tend to be specific to individual transactions. In one embodiment then, after the application-port mapping table has provided the application identifier, the packet analysis module separately analyzes the packet, as above. If this analysis is successful and an application is identified, this application will be given the packet, regardless of the application identified by the application-port mapping table.

In one embodiment, outdated associations defined in the application-port mapping table are periodically removed through a garbage collection process, so that the current dynamic associations will always be present in table. In one embodiment, the newly created entries in the application-port mapping table have an expiration time. The packet analysis module periodically checks the application-port mapping table, and removes associations that have expired. In one embodiment, the expiration time of an application-port association is based on the timestamp of the last packet that matched the port of the association, plus a local timeout value (a fixed number of seconds). The expiration time may be compared to either a current time, or the timestamp of the last received packet to determine whether it has expired. In this manner, the table is maintained with the most current associations between applications and ports, as determined by the packet data itself.

The use of expiration times further allows for another optimization of the packet analysis module's performance. Since the expiration time of each application-port association ensures that the application-port mapping table is always current, in one embodiment, the packet analysis module processes the packet a second time only when the application-port mapping table is unable to identify the packet. In this manner, the packet analysis module updates the application-port mapping table only as needed, which is when the packet cannot be matched to an application-port mapping that has been previously detected.

The present invention may be implemented in a number of different manners. One implementation uses an object oriented collection of objects to provide the described functionality and features. The application-port mapping table is implemented as a collection of application map objects, each storing an application identifier and port association, and an optional expiration time where garbage collection is used. The packet analysis module is implemented as an application source object and a collection of application identifier objects. Each of the application identifier objects implements a method that encodes the logic used to identify a specific application from the packet data.

The application map objects are initialized with a set of standard, static application identifier-port associations. The application source object receives a packet from a packet source object, and traverses the collection of application map objects to obtain a first application identifier from the application map object having a matching port. If none of the application map objects match the packet, then the application is deemed "unknown."

The application source object also traverses the application identifier objects, having each one process the packet to separately identify the application. Each application identifier object returns either an application identifier of the specific application it recognizes or an "unknown" if the application identifier object does not recognize the packet.

If the packet is recognized by one of the application identifier objects, then the application source object instantiates a new application map object with the application identifier returned by the application identifier object which recognized the packet, and a port number from the packet. The application source object then passes the packet to the second, identified application. Summary data, may now be accurately accumulated for all packets, to accurately monitor network performance.

BRIEF DESCRIPTION OF THE DRAWINGS

FIG. 1 is the header of an HTTP packet over TCP/IP using a standard port mapping.

FIG. 2 is the header of an HTTP packet over TCP/IP using a non-standard port mapping.

DETAILED DESCRIPTION OF THE INVENTION

Figure 3:
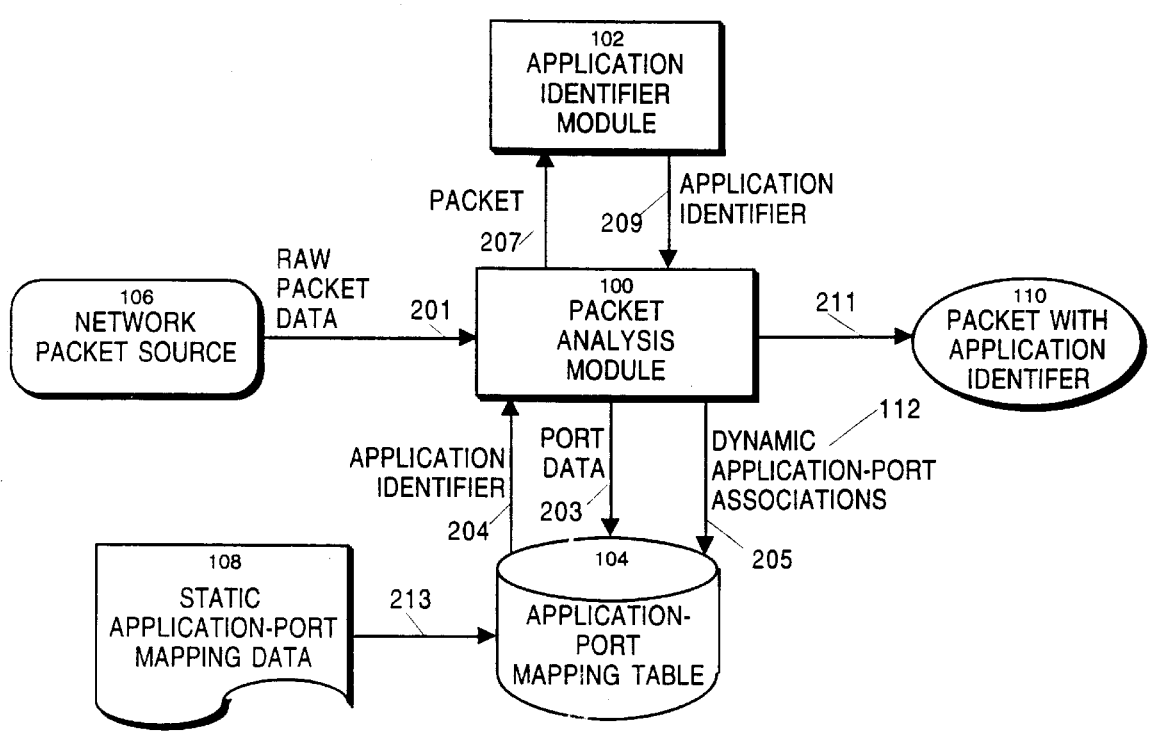
FIG. 3 is a functional model of a system in accordance with the present invention.

Referring now to FIG. 3 there is shown a functional model of the present invention for identifying applications and network protocols from raw packet data. In this embodiment, the present invention includes a packet analysis module 100, an application identifier module 102, and an application-port mapping table 104. These elements may be included in various different products, such as network monitors, protocol decoders, protocol analyzers, routers, brouters, bridges, or the like.

The application-port mapping table 104 stores associations between application identifiers and port numbers. Each application identifier identifies a different application available on the computer (or network of computers for distributed applications) capable of receiving or processing the packet. Each application has a unique identifier. A special 'unknown' application identifier (e.g. "APP_UNKNOWN") is used to represent an unknown application, though a mapping for the unknown application need not be stored in the table. The application-port mapping table 104 is cached in memory for high speed access.

Upon startup, the application-port mapping table 104 is initialized 213 with some number of static application-port associations 108. These static associations (or 'mappings') are based on the published specifications for the various applications and protocols, and their standard port numbers. Table 1 includes a preferred list of network applications, application identifiers, and their standard ports used to define the static application-port associations 108.

TABLE 1

| Application | Port | Application Identifier |
|---|---|---|
| HTTP | 80 | APP_HTTP |
| FTP | 20 | APP_FTP |
| FTP | 21 | APP_FTP |
| SMTP | 25 | APP_SMTP |
| NNTP | 119 | APP_NNTP |
| POP3 | 110 | APP_POP3 |

The application-port mapping table 104 will be later updated 205 by the packet analysis module 100 with dynamic associations 112 between application identifiers and ports based on the actual packet data that is received from the packet source 106. The packet source 106 is any useful source of packet (layer 3) data.

The packet analysis module 100 receives 201 raw packet data from the network packet source 106, typically through some network interface, such as a network interface card. The packet analysis module 100 decomposes this packet, extracting various field data from the packet. The extracted data includes the source port, the destination port from the packet header, and the payload.

The packet analysis module 100 applies 203 the port numbers from the packet to application-port mapping table 104 to obtain an application identifier. If there is an association that matches the port data, then application-port mapping table 104 returns 204 the application identifier for the network application. The application-port mapping table 104 will be able to return an application identifier if either the port number is a standard port number for the application and included in the original set of static application-port mappings, or is a new application identifier-port mapping extracted from the received packets, and stored in the application-port mapping table. If there is no matching port, then the packet analysis module 100 assigns the result as being the unknown application identifier.

In one embodiment, even if the application-port mapping table 104 returns 204 an application identifier for a specific application, the present invention provides an additional sequence of processing steps to verify this application, which in some instances may be incorrect. This is done as follows. The packet analysis module 100 passes 207 the packet to the application identifier module 102. This module 102 analyzes the packet to determine 209 an application appropriate for handling the packet.

The application identifier module 102 attempts to match portions of the packet data, including the payload or header, with defined patterns or attributes for each of a plurality of different applications. Generally, for each application there are one or more bit patterns which uniquely identify the application. These patterns may be in the payload data, in the header, or in combinations of both. The bit patterns are defined as sequences of <offset, bit patterns> tuples. Each application may have one or more such sequences which uniquely identifies it. Table 2 includes preferred bit patterns used to identify selected network applications, along with the port used to map the application into the application-port mapping table 104. Alternate patterns are shown numbered.

TABLE 2

| Application | Data Patterns <bit offset, data pattern> | Port Used in Mapping |
|---|---|---|
| HTTP | <0, "GET"><4,URL><n, "HTTP/1."> | Destination |
| NNTP | <0, "GROUP"><6, newsgroup><n, CRLF> <n + 2, EndofFrame> | Destination |
| SMTP | 1) <0, "220_"><4, server_name> <n, "Simple Mail Transfer Service Ready"> | Source |
|  | 2) <0, "MAIL FROM: <"><11, email_addr> <n, CRLF> | Destination |
|  | 3) <0, "RCPT TO: <"><9, email_addr> <n, CRLF> | Destination |
| POP3 | 1) <0, "+OK POP3 server ready"><22, CRLF> | Source |
|  | 2) <0, "+OK"><4, number><n, "messages ("><n+10, number><m, "octets)"> | Source |
| FTP | 1) <0, "230 User logged in"> | Source |
|  | 2) <0, "227 Entering Passive Mode ("><26, n1, n2, n3, n4, n5, n6><n,")"> [where $n_i$<256] | Source |
|  | 3) <0, "PORT"<5, n1, n2, n3, n4, n5, n6> [where $n_i$<256] | Destination |

Here URL, newgroup, server_name, email_addr, and number are valid forms as defined by their respective protocols. The identification of these patterns may done through various types of pattern matching algorithms, or simple conditional testing.

In one embodiment, the application identifier module 102 processes the packet data until it positively identifies one application, and returns 209 the application identifier for this application.

In another embodiment, the application identifier module 102 identifies all applications that may be appropriate and applies a selection logic to select one of these as the most appropriate application, returning 209 the application identifier for this application. One implementation of the selection logic is to assign a confidence factor to each pattern or logic used to identify an application. When multiple applications are identified, the application identifier module 102 selects the application having the highest confidence factor.

If the application identifier module 102 is unable to match the packet data with any applications, then it returns 209 the unknown application identifier to the packet analysis module 100. Alternatively, the application identifier module 102 returns a null result to the packet analysis module 100, which assigns an unknown application identifier to the outcome.

If the application identifier returned by the application identifier module 102 identifies an application (i.e. the application is not unknown) then the packet analysis module 100 creates 205 a new entry in the application-port mapping table 104 using the returned application identifier from the application identifier module 102 and a port number from the packet. The port used is determined by the specific method used to identify the application, as shown in the examples of Table 2. The packet analysis module 100 checks to make sure that duplicate entries for a port are not present, replacing any previous association with the new association. Where garbage collection is used, the packet analysis module 100 also sets an expiration time for this new association. Preferably the expiration time is equal to the timestamp of the packet plus a local timeout value. The new association will enable the application-port mapping table 104 to return 203 the correct application identifier for packets which use the same port number, which will be other than the standard default ports for that particular application. In this manner, the application-port mapping table 104 is continually updated to reflect the dynamic application-port associations present in the packet data, and not merely the static associations set by the standards authorities, such as the IANA. When a subsequent packet, typically in the same transaction, is received, the packet analysis module 100 will be able to obtain the correct application identifier from the application-port mapping table 104 immediately, and then verify it in the application identifier module 102.

After the packet is identified, it is provided 211 to the specified application for processing. This processing may include any type of analysis or use of the packet.

If the application identifier module 102 was not able to identify the packet, then the application identified 203 by the application-port mapping table 104 is used to invoke 211 an application for processing the packet.

If neither the application-port mapping table 104 or the application identifier module 102 is able to identify a packet, then the packet is discarded, or alternatively, passed to a default application for handling unknown packets.

Where garbage collection is used, the packet analysis module 100 periodically scans the application-port mapping table 104 to check the expiration time of each association. If an association has expired, then the packet analysis module 100 removes it from the application-port mapping table 104. In one embodiment, the packet analysis module 100 stores a global timeout value, which defines a fixed number of seconds. This global timeout value is preferably 10 to 20 times the local timeout value. Each time a packet is received, the packet analysis module 100 compares the difference between the timestamp of the current packet and the previous packet to the global timeout value. If the difference in timestamps exceeds the global timeout value, then the packet analysis module 100 removes the expired associations from the application-port mapping table 104, as described. This may be done as the packet analysis module 100 queries the application-port mapping table 104 for a matching port.

The expiration times of the application-port mapping table 102 and garbage collection process of the packet analysis module 100 enables a further performance optimization of the packet analysis module 100. Since the garbage collection ensures that the application-port mapping table 104 always maintains the current application-port associations, the packet analysis module 100 can decide to invoke the application identifier module 102 only when the application-port mapping table 104 is unable to identify an application from the ports of the packet. In this way, the application identifier module 102 is used only as needed to create a new association in the application-port mapping table 104. This implementation provides for higher throughput by the packet analysis module 100.

The present invention may be implemented in different types of software products, using various software architectures, which execute on standard computer hardware platforms.

Figure 4:
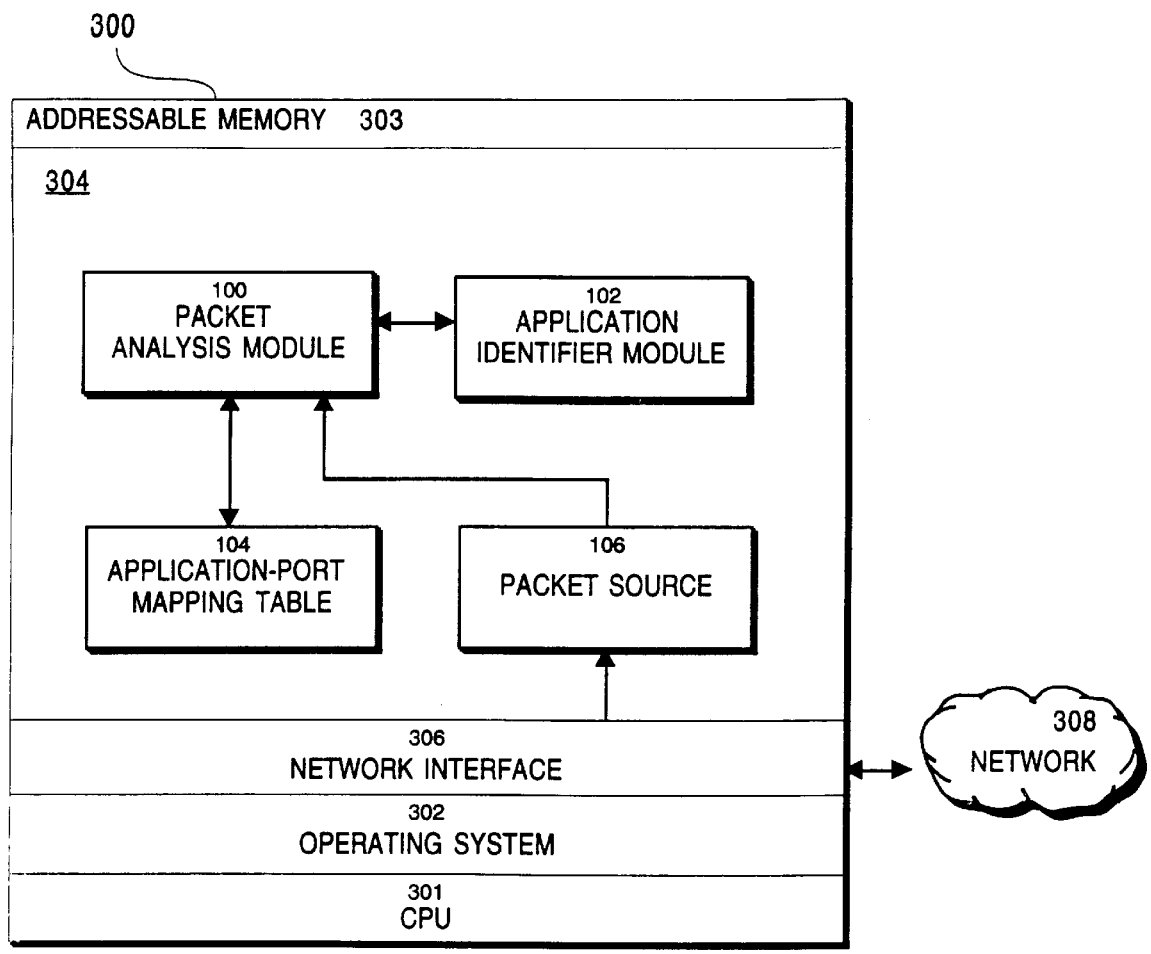
FIG. 4 is an illustration of a hardware architecture for implementing the present invention.

Referring now to FIG. 4, there is shown one embodiment of a system architecture supporting a software product embodying the present invention. A preferred system includes a general purpose computer 300, having a conventional processor 301, addressable memory 303, and input and output devices (not shown). The addressable memory 303 includes a conventional operating system 302, such as UNIX®, or Microsoft Windows®, or the like. The addressable memory 303 further includes a software product 304 structured in accordance with the present invention. The software product 304 may be a network monitor, protocol decoder, protocol analyzer, or the like. A network interface, such as a network interface card 306, couples the computer to a conventional network 308.

Figure 5:
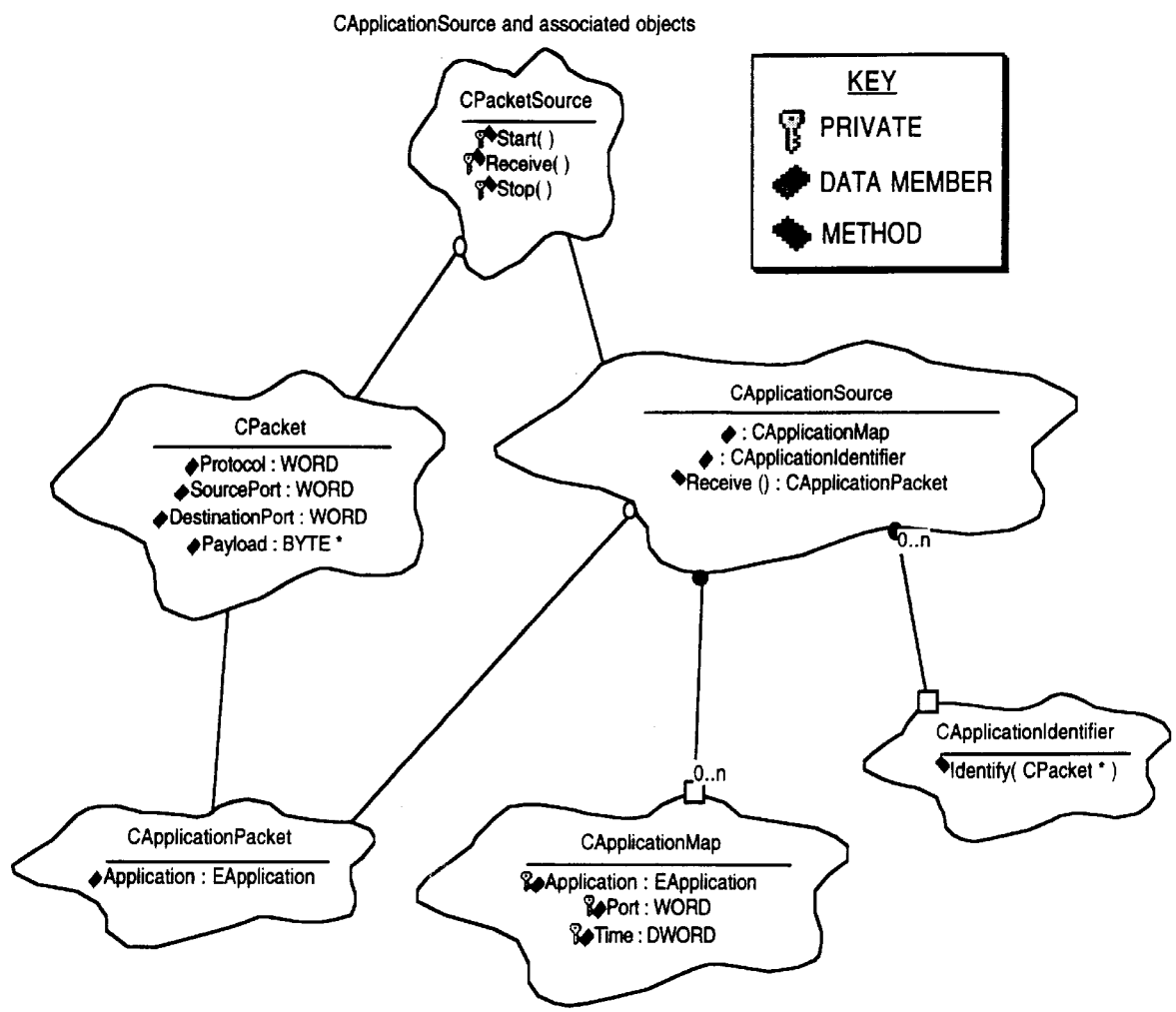
FIG. 5 is an object model of a software product in accordance with the present invention.

Referring now to FIG. 5, there is shown an object model for one implementation of the software architecture of the software product 304. The main entities are as follows:

EApplication: EApplication is an enumerated type of application identifiers. These identifiers are defined uniquely, one per application. The identifiers listed above with respect to Table 1 may be used. The actual values themselves are not significant, only the uniqueness of each identifier. A special application identifier, here called "APP_UNKNOWN" is used to represent an application that could not be identified by the system.

CPacketSource: The CPacketSource is used as a generic source of packet data for the system. This object may be instantiated as a way to read trace files or to receive data from a network interface card. The CPacketSource provides three methods to access data:

Start: This method initializes the system to begin receipt of packet data.

Receive: This method returns a packet, in the form of a CPacket object.

Stop: This method shuts down the receipt of packets.

CPacket: The CPacket represents a packet of information broken out into useful information about the packet. A CPacket object is returned by the CPacketSource from the Receive method. The CPacket has the following public member variables:

Protocol: Stores the protocol type in the packet, for example. TCP/IP, IPX, SPX.

SourcePort: Stores the source port or socket number.

DestinationPort: Stores gives the destination port or socket number.

Payload: Stores the payload carried by the packet after the protocol header has been removed by CPacketSource.

CApplicationMap: The CApplicationMap is an object that represents an association between an application identifier in an EApplication and a port or socket number. A collection of CApplicationMap objects is instantiated for the statically defined ports and sockets, as defined by a standards authority or other source. The CApplicationSource object, described below, maintains the collection, and adds new CApplicationMap instances when application to port associations are dynamically discovered from the packet data. The collection of CApplicationMap objects represent the application-port mapping table 104.

Each CApplicationMap contains the following member variables:

Application: a reference to the EApplication with the appropriate application identifier.

Port: The port number for the association.

Time: an expiration time used to remove dynamic entries from the collection when they are no longer deemed valid.

CApplicationidentifier: The CApplicationIdentifier objects perform the analysis of the payload or header data of a CPacket to identify the application for a packet. There is one CApplicationidentifier object for each different type of application. Each CApplicationIdentifier object has a single method, Identify, which is passed a CPacket and analyses its payload and/or header to return an CApplicationMap for an application which is appropriate for the packet. The method of identification is particular for each application to be identified, depending on various types of characteristics in the payload or header data. Table 2, above lists the various characteristics useful for identifying different applications. These characteristics may be encoded in the logic of each object's Identify method as desired.

An example of an Identify method for identifying an HTTP packet is:

```
if (Payload == "GET <valid-URL>HTTP/1.")
    Application = APP_HTTP
    Port = DestinationPort
else
    Application = APP_UNKNOWN
```

The collection of CApplicationIdentifier objects represent the application identifier module 102.

CApplicationPacket: This object derives from CPacket, and contains an additional member function Application (of type EApplication) which represents the application identified from the packet. This function invokes the specified application. A CApplicationPacket instance is created by the CApplicationSource (described below) after the application for the packet has been identified by a CApplicationIdentifier object or a CApplicationMap.

CApplicationSource: This object controls the operation of product 304, and implements the packet analysis module 100. It has the following major functions:

Constructor: The constructor method creates a collection of CApplicationMap and CApplicationIdentifier objects. The collection of CApplicationMap objects is initialized with the static application-port mappings, for example as shown in Table 1.

Start: This method creates a CPacketSource object and invokes its Start method.

Stop: This method invokes the Stop method of the CPacketSource to stop receipt of packet data.

Destructor: This method removes the CApplicationMap and CApplicationIdentifier collections.

Receive: This method performs the work of managing the identification of a packet.

Figure 6:
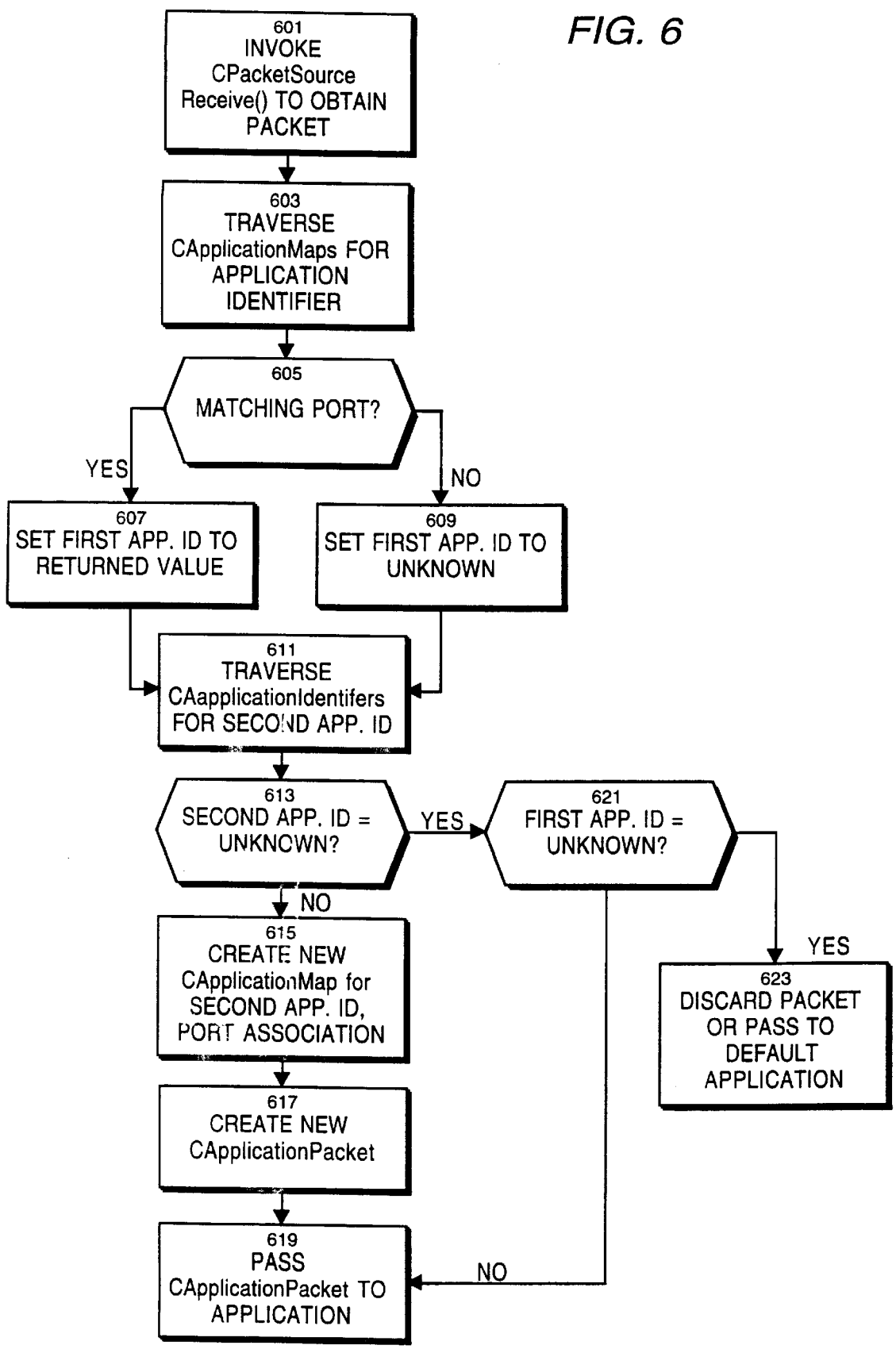
FIG. 6 is a flowchart of a method for managing the identification of an application for a packet.

FIG. 6 illustrates one embodiment of the Receive method. The CApplicationSource's Receive method invokes 601 the Receive method of the CPacketSource object to obtain a packet of data in a CPacket. When a packet is received, the only information known is the port numbers, the application is not known.

Receive then traverses 603 CApplicationMap collection, passing the port numbers of the CPacket to each CApplicationMap object, and obtaining an application identifier, if there is a match. This search is to identify the application for this packet, from the static application-port associations or from previously generated dynamic associations. If there is a match (605) between the port numbers of the packet and one of CApplicationMap objects, then the returned application identifier is stored 607 as a first application identifier, which is stored as App1. If none of the CApplicationMap objects matches, then the only information known about the packet is the transport protocol, and so the Receive method sets 609 the first application identifier to APP_UNKNOWN.

In one embodiment, even if the first application identifier is not unknown, the Receive method performs a verification check on the application using the CApplicationIdentifier object. If the first application identifier is APP_UNKNOWN, then identification using the Identify method becomes particularly significant, since otherwise the packet will not be correctly identified. In fact, with many packets, the first application identifier will be APP_UNKNOWN since the application itself is maintaining its state with respect to the packet stream as a whole, and waiting for a terminating packet. For a product 304 such as a network monitor to maintain such state, protocol identification of each packet is necessary.

Accordingly, the Receive method then traverses 611 the CApplicationIdentifier objects to obtain a second application identifier from at least one of these objects, based on the payload or header data for the packet. The Receive method calls 611 the Identify method of each (or several) CApplicationidentifier object, and passes in the CPacket object. Each CApplicationIdentifier object will attempt to identify the packet as being of its own type, and return a second application identifier for the identified application.

In one embodiment, the Receive method maintains a local variable App2, which is updated with the returned second application identifier from the CApplicationIdentifier objects. In one embodiment, when App2 takes on any value other than APP_UNKNOWN, the Receive method stops, and uses this value to identify the application for the packet. Alternatively, the Receive method traverses all of the CApplicationIdentifiers, and if multiple matches are obtained, selects one of the application identifiers as the second application identifier, using a selection logic, for example, based on confidence factors for matching application identifiers.

If the second application identifier is not APP_UNKNOWN (613), the Receive method then creates 615 a new CApplicationMap object to store the association between a port number in the CPacket and the second application identifier for the identified application. The port used, whether destination or source, depends on the particular method of identification for the application. Typically, the destination port is used where an identification is made from a client request, and the source port is used where an identification is made from a server reply.

Prior to instantiating the new CApplicationMap object, the Receive method removes any existing CApplicationMap object having the same port number, thereby preventing any duplicate ports from appearing in the collection of CApplicationMap objects. Alternatively, if the Receive method identifies a previously existing CApplicationMap object with the same application identifier, it updates its port with the current port from the packet.

If none of the CApplicationIdentifier objects is able to identify the CPacket, then the second application identifier will remain APP_UNKNOWN (613). In this case, if first application identifier is also APP_UNKNOWN (621), then the packet is either discarded or passed 623 to a default application for handling.

If the second application identifier is not APP_UNKNOWN, then the application for the packet has been identified. The Receive method instantiates 617 a new CApplicationPacket object, storing therein the packet data from the CPacket object, and the reference to the appropriate EApplication for the application identifier. This application identifier will be the first application identifier if the CApplicationIdentifier objects were not able to identify the packet from the payload data. Otherwise, it will be the second application identifier. The application represented by the EApplication value is passed the CApplicationPacket object.

In an alternative embodiment, the CApplicationIdentifier objects may be replaced by an array of "patterns", each of which define a mapping from the pattern to the EApplication. For example a pair of patterns for the HTTP protocol may be:
<SourcePort, DestinationPort, Pattern, EApplication, DynamicPort>
80, *, "*", APP_HTTP, 80
*, 80, "*", APP_HTTP, 80
*, *, "GET <valid-url> HTTP/1.", APP_HTTP, DestinationPort The first two lines represent the static mapping of port 80 to the application APP_HTTP (where "*" means "anything") and the last line represents the dynamic mapping when the payload contains a line of the form GET <valid-url> HTTP/x.y, assuming that the <valid-url> is a special pattern representing any URL as defined in URL specification for HTTP (RFC 1738). This implementation makes it easier for the developer of the system to alter the mappings since they may easily be stored in a text file that is loaded and processed when the CApplicationSource constructor is called. To use this implementation, the CApplicationSource sequentially processes the lines and patterns to find the right match of port and EApplication.

Figure 7:
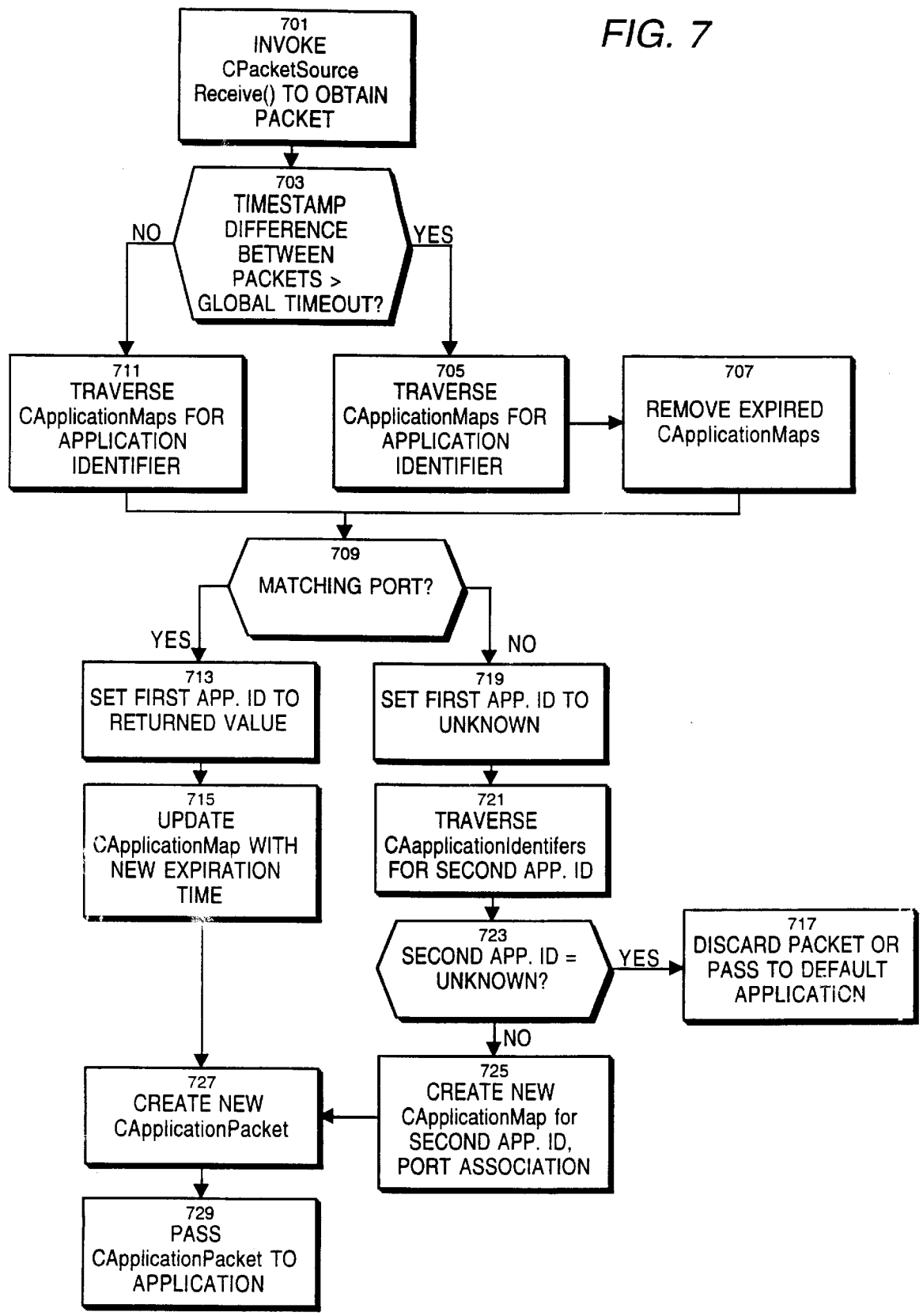
FIG. 7 is a flowchart of an optimized method for managing the identification of application for a packet.

Referring now to FIG. 7, there is shown an optimized embodiment of the Receive method, employing garbage collection of the CApplicationMap objects and selective use of the CApplicationIdentifier objects. In this implementation, the CApplicationSource maintains a global timeout value, typically on the order of 1 to 5 seconds, and maintains a timestamp difference variable which is the difference in timestamps between a currently received packet and a previously received packet.

The Receive method invokes 701 the Receive method of the CPacketSource object to obtain a packet. The Receive method then compares 703 the timestamp difference for the current packet with the global timeout value. If the timestamp difference is greater than the global timeout, then sufficient time has elapsed since the previous packet was received to warrant garbage collection of the expired CApplicationMap objects. Accordingly, the Receive method traverses 705 the CApplicationMaps to obtain an application identifier, and as each CApplicationMap object is called, the Receive method checks the expiration time of the object against the current time, or alternatively, against the timestamp of the current packet. If the expiration time of the CApplicationMap object is less than the current time/timestamp, then the association between the application and port in the CApplicationMap is expired, and the Receive method removes 707 that object.

If the timestamp difference does not exceed the global timeout, then the Receive method traverses 711 the CApplicationMap objects without removing 707 expired objects.

If a CApplicationMap object is able to identify the packet by matching 709 a port of the packet, then the first application identifier is set 713 to the returned value of the CApplicationMap object. In addition, the Receive method updates 715 the expiration time of that CApplicationMap object, preferably setting the expiration time equal to the timestamp of the packet plus the local timeout value (0.1 to 1 second preferably). At this point the packet is identified, and since the CApplicationMap objects are always current due to the garbage collection, there is no need to invoke the CApplicationIdentifier objects to identify the packet. The Receive method creates 727 a new CApplicationPacket object with the packet and application identifier information, and passes 729 the CApplicationPacket to the identified application. This optimization increases the throughput of the system, and updates the CApplicationMap objects to always reflect the dynamic mappings of the application to ports as reflected by the packet data.

If the CApplicationMap objects were not able to identify the packet, then the Receive method sets 719 the first application identifier to unknown, and traverses 721 the CApplicationIdentifier objects to identify the packet, and obtain a second application identifier, as described above. If the second application identifier is APP_UNKNOWN (723) then the packet is either discarded or passed 717 to a default application.

If the CApplicationIdentifier objects were able to identify the application for the packet, and thus the second application identifier is not APP_UNKNOWN, then the Receive method creates 725 a new CApplicationMap object, associating the second application identifier with the matching port of the packet.

The Receive method then creates 727 a new CApplicationPacket object with the packet and application identifier information, and passes 729 the CApplicationPacket to the identified application.

The above described embodiment for the CApplicationMap objects uses a expiration time remove dynamic associations from the CApplicationMap collection when they have not been accessed for more than some fixed number of seconds. An alternative method of garbage collection is to detect the appearance of each protocol's own "end of sequence" identification as a signal to remove an association from the application-port mapping table 102, via the applicable CApplicationMap object. For example, in TCP, the FIN flag in the header may be scanned for, and upon its detection, the appropriate entry removed. This implementation is slightly slower, but also slightly more memory efficient.

In summary then, there is described a system, method, and software product for dynamically mapping the associations between applications and ports as extracted from the packet data being analyzed. The present invention thereby provides for improved accuracy in the detection and accounting of traffic data, and in the ability to accurately report and manage such traffic.

I claim:

1. A computer implemented method for dynamically determining a network application for a stream of network packets, each packet including a header having a source port and a destination port, and a payload, the method comprising:

storing an application-port map containing a plurality of associations between application identifiers and ports, each application identifier identifying a network application;

determining from the application-port map a first application identifier associated with a port of a received packet, the first application identifier identifying a first network application;

processing the received packet to identify a second network application for handling the received packet by applying an identification logic to the payload of the received packet to detect a data pattern within the received packet indicative of the second network application;

responsive to successfully identifying a second network application by the detection of the data pattern within the received packet:

setting an application identifier of the second network application as a second application identifier;

creating a new association in the application-port associating the second application with the port of the packet; and passing the received packet to the second network application;

and responsive to unsuccessfully identifying a second network application, passing the packet to the first network application.

2. The method of claim 1, further comprising:

establishing an expiration time for the new association in the application-port map; and periodically removing from the application-port map associations that have expired according to their expiration times.

3. The method of claim 1, further comprising:

detecting a packet indicating an end of a sequence of packets for a selected network application; and removing from the application-port map an association including an application identifier for the selected network application.

4. The method of claim 1, wherein the processing of the received packet to identify the second application identifier for handling the received packet, further comprises:

applying selected data from the payload to a plurality of patterns, each pattern including a sequence of data uniquely indicative of a network application, until the selected data matches a pattern; and setting an application identifier of the second network application whose pattern matches the selected data as the second application identifier.

5. The method of claim 1, wherein determining from the application-port map the first application identifier associated with the port of the received packet, further comprises:

determining a timestamp difference between a timestamp of the received packet and a timestamp of a previous packet; and responsive to the timestamp difference exceeding a predetermined threshold, removing from the application-port map associations having expiration times earlier than a current time.

6. A computer implemented method for dynamically determining a network application for a stream of network packets, each packet including a header having a source port and a destination port, and a payload, the method comprising:

storing an application-port map containing a plurality of associations between application identifiers and ports, each application identifier identifying a network application;

determining whether the application-port map includes an association between an application identifier and a port of a received packet;

determining a timestamp difference between a timestamp of the received packet and a timestamp of a previous packet;

responsive to the timestamnp difference exceeding a predetermined threshold, removing from the application-port map associations having expiration times earlier than a current time; and responsive to the application-port map including an application identifier associated with the port of the received packet, updating an expiration time of association including the application identifier as a function of a timestamp of the received packet;

responsive to the application-port map including the application identifier associated with the port of the received packet, passing the received packet to the first network application, and receiving a next packet; and responsive to the application-port map not including the application identifier associated with the port of the packet:

processing the received packet to identify a second network application for handling the received packet by detecting a data pattern within the received packet indicative of the second network application;

creating a new association in the application-port map associating a second application identifier identifying the second network application with the port of the received packet; and passing the received packet to the second network application.

7. A system for dynamically determining a network application for a stream of network packets, each packet including a header having a source port and a destination port, and a payload, the system comprising:

an application-port mapping table comprising a plurality of first application-port mapping objects, each object storing an association between an application identifier and a port, each object returning a respective application identifier in response to a port, and each application identifier identifying a network application;

a packet analysis module that receives a packet from a network source and applies a port from the received packet to the application-port mapping table to obtain a first application identifier, the first application identifier indicating a first network application for processing the packet; and an application identifier module that receives the received packet from the packet analysis module and determines from the received packet a second application identifier indicating a second network application by detecting a data pattern within the received packet indicative of the second network application, the application identifier module comprising a plurality of application identification objects, each application identification object including an identify method that encodes logic for identifying a selected network application from payload or header data of the received packet, and returning an application identifier associated with the selected application, wherein the packet analysis module queries the application-port mapping objects to obtain the first application identifier, and queries the application identifier objects to obtain the second application identifier, and responsive to the second application identifier indicating the second network application, creates a new association in the application-port mapping table between the second application identifier for the second network application and the port of the received packet, and provides the received packet to the second network application, and responsive to the second application identifier indicating an unknown application, provides the packet to the first network application.

8. The system of claim 7, wherein the packet analysis module establishes an expiration time for the new association in the application-port mapping table, and periodically removes from the application-port mapping table associations which have expired according to their expiration times.

9. The system of claim 7, wherein:

the packet analysis module detects a packet indicating an end of a sequence of packets for a selected network application, and removes from the application-port mapping table an association including an application identifier for the selected network application.

10. A system for dynamically determining a network application for a stream of network packets, each packet including a header having a source port and a destination port, and a payload, the system comprising:

an application-port mapping table containing a plurality of associations between application identifiers and ports, each application identifier identifying a respective network application;

a packet analysis module that receives a packet from a network source and applies a port from the received packet to the application-port mapping table to obtain a first application identifier, the first application identifier indicating a first network application for processing the received packet, and responsive to the application-port mapping table including an association between a first application identifier and the part of the received packet, provides the received packet to the first network application, and responsive to the application-port mapping table not including an association between an application identifier and the port of the received packet, provides the received packet to an application identifier module; and the application identifier module that receives the received packet from the packet analysis module and determines from the received packet a second application identifier identifying a second network application for processing the received packet by applying an identification logic to the payload of the received packet to detect a data pattern within the received packet indicative of the second network application, wherein the packet analysis module, responsive to the second application identifier indicating a second network application, sets an application identifier of the second network application as the second application identifier, creates a new association in the application-port mapping table between the second application identifier and the port of the received packet, and provides the received packet to the second network application.

11. A computer implemented method for dynamically determining a network application for a stream of network packets, each packet including a header having a source port and a destination port, and a payload, the method comprising:

storing a plurality of associations between network applications and ports;

responsive to a stored association between a first network application and a port of a received packet, providing the received packet to the first network application for processing; and responsive to an absence of a stored association between a first network application and the port of the received packet;

analyzing the received packet to identify a second network application for handling the received packet by applying an identification logic to the payload of the received packet to detect a data pattern within the received packet indicative of the second network application;

setting an application identifier of the second network application as a second application identifier; and storing a new association associating the second application identifier with the port of the received packet.

* * * * *